United States Patent
Yuen et al.

(10) Patent No.: US 10,360,406 B2
(45) Date of Patent: Jul. 23, 2019

(54) METHOD OF OBFUSCATING DATA

(71) Applicant: HUAWEI INTERNATIONAL PTE. LTD., Singapore (SG)

(72) Inventors: Tsz Hon Yuen, Singapore (SG); Shuang Wu, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 272 days.

(21) Appl. No.: 15/372,122

(22) Filed: Dec. 7, 2016

(65) Prior Publication Data
US 2017/0091485 A1  Mar. 30, 2017

Related U.S. Application Data

(63) Continuation of application No. PCT/SG2016/050134, filed on Mar. 23, 2016.

(30) Foreign Application Priority Data

Mar. 26, 2015 (SG) .................. SG10201502401X

(51) Int. Cl.
H04L 9/00 (2006.01)
H04L 9/06 (2006.01)
G06F 21/62 (2013.01)

(52) U.S. Cl.
CPC .......... *G06F 21/6254* (2013.01); *H04L 9/002* (2013.01); *H04L 9/0618* (2013.01); *H04L 9/0643* (2013.01); *H04L 2209/16* (2013.01)

(58) Field of Classification Search
None
See application file for complete search history.

(56) References Cited

U.S. PATENT DOCUMENTS 8,787,563 B2 * 7/2014 Shirai ............... H04L 9/0643
                                              380/28
8,788,803 B2 * 7/2014 Irvine ............... G06F 21/6218
                                              713/150

(Continued)

FOREIGN PATENT DOCUMENTS

CN       103562851 A     2/2014

OTHER PUBLICATIONS

Dodis et al., "Public-Key Encryption Schemes with Auxiliary Inputs," pp. 1-25 (2010).

*Primary Examiner* — Christopher A Revak
(74) *Attorney, Agent, or Firm* — Leydig, Voit & Mayer, Ltd.

(57) ABSTRACT

A system and method for obfuscating data includes random numbers generated by applying a one-way compression function to auxiliary inputs which may at least include a secret key and a data partner identifier. For each row of data to be obfuscated, the following is performed: a plurality of data blocks is constructed from the each row of data to be obfuscated, wherein the number (n) of the data blocks is predetermined; a dot product is generated which is obtained by: generating a plurality of products by multiplying each of the plurality of data blocks with an exclusive one of the plurality of random numbers and summing the plurality of products; and an obfuscated form of the each row of data to be obfuscated is generated by determining a remainder of a modulo operation which is performed using the dot product as dividend and a predetermined integer value as divisor.

15 Claims, 4 Drawing Sheets

(56) References Cited

U.S. PATENT DOCUMENTS

| | | |
|---|---|---|
| 2006/0179075 A1 | 8/2006 | Fay |
| 2008/0181396 A1 | 7/2008 | Balakrishnan et al. |
| 2010/0306854 A1 | 12/2010 | Neergaard |
| 2012/0303616 A1 | 11/2012 | Abuelsaad et al. |
| 2013/0054650 A1 | 2/2013 | O'Byrne |
| 2014/0041039 A1* | 2/2014 | Saldamli ............ H04L 9/008 726/26 |

* cited by examiner

Table 1a

| Mobile Number | Name | Gender | Age |
|---|---|---|---|
| 98765432 | Alice | F | 18 |
| 98888888 | Bob | M | 20 |
| 96385274 | Carol | F | 42 |
| 95162384 | Alice | F | 23 |

Table 1b

| Mobile Number | GPS | Time |
|---|---|---|
| 98765432 | (12,24) | 12:20 |
| 98888888 | (12,24) | 13:20 |
| 96385274 | (22,24) | 14:00 |
| 95162384 | (18,34) | 12:14 |

Figure 1

(Prior Art)

Table 2a

| Mobile Number | GPS | Time |
|---|---|---|
| ABCDEFGH | (12,24) | 12:20 |
| ASDFGHJK | (12,24) | 13:20 |
| QWERTYUI | (22,24) | 14:00 |
| ZXCVBNML | (18,34) | 12:14 |

Table 2b

| Mobile Number | Gender | Age |
|---|---|---|
| ABCDEFGH | F | 18 |
| ASDFGHJK | M | 20 |
| QWERTYUI | F | 42 |
| ZXCVBNML | F | 23 |

Table 2c

| Mobile Number | Job | Income |
|---|---|---|
| ABCDEFGH | teacher | 18000 |
| ASDFGHJK | doctor | 20000 |
| QWERTYUI | lawyer | 40000 |
| ZXCVBNML | banker | 20000 |

Figure 2

(Prior Art)

METHOD OF OBFUSCATING DATA

CROSS-REFERENCE TO RELATED APPLICATIONS

This application is a continuation of International Application No. PCT/SG2016/050134, filed on Mar. 23, 2016, which claims priority to Singaporean Patent Application No. SG10201502401X, filed on Mar. 26, 2015. The disclosures of the aforementioned applications are hereby incorporated by reference in their entireties.

TECHNICAL FIELD

The application relates to data obfuscation in data sharing applications and more particularly to a method of obfuscating data, which provides collision resistance, irreversibility, computational efficiency, collusion resistance, and pseudo-randomness in the obfuscated data.

BACKGROUND

Data sharing is common in scientific research as well as in business. A telecommunication service provider (TSP) may obtain user or subscriber information as set out in Tables 1a to 1b of FIG. 1.

The telecommunication service provider may wish to share this information with their business partner who may wish to assess whether a certain location (12, 24) is desirable for setting up a cosmetic shop. Accordingly, the telecommunication service provider may provide Tables 1a and 1b to the partner who then checks for human traffic patterns around that location, especially of their target clientele (e.g. young women). However, under the US standards according to the National Institute of Standards and Technology, a mobile number is considered Personally Identifiable Information (PII). PII refers to information that can be used on its own or with other information to identify, contact, or locate a single person, or to identify an individual in context. PII can be regarded as any information about an individual maintained by an agency, including (1) any information that can be used to distinguish or trace an individual's identity, such as name, social security number, date and place of birth, mother's maiden name, or biometric records; and (2) any other information that is linked or linkable to an individual, such as medical, educational, financial, and employment information.

Accordingly, directly sharing data from Tables 1a and 1b may compromise the privacy of the listed users, and thus may result in an offense. Deleting the mobile numbers from Tables 1a and 1b would resolve the privacy issue but does not provide useful data since the mobile numbers are used as the primary (linking) key to link the data in these two tables. Accordingly, obfuscation of data is needed.

If the obfuscated data shared with different partners are the same, then there exists a risk of collusion attack. FIG. 2 shows Tables 2a to 2c which are respectively shared with different partners. Since the encrypted mobile numbers provided to the different partners are the same, the partners may collude to re-construct an almost complete portfolio for every subscriber, which would then infringe upon user privacy.

Existing methods relating to data obfuscation are described in US patent application publication numbers US 2008/0181396 A1 (Balakrishnan et al.) "Data Obfuscation of Text Data Using Entity Detection and Replacement" and US 2012/0303616 A1 (Abuelsaad et al.) "Data Perturbation and Anonymization Using One Way Hash". While existing solutions could be efficient for single use, it would not be efficient if there are millions or even billions of rows of data to be obfuscated. In the present era, high volumes of data are generated at a high velocity and, accordingly, a more efficient method of obfuscation is desirable.

SUMMARY

Embodiments of the application provide an efficient method and system for obfuscating data which satisfy other security requirements including collision resistance, irreversibility, computational efficiency, collusion resistance, and pseudo-randomness in the obfuscated data.

According to one embodiment of the application, a method of obfuscating data is provided. The method comprises:

generating a plurality of random numbers by applying a one-way compression function to a plurality of auxiliary inputs; and iteratively, for each row of data to be obfuscated:
constructing a plurality of data blocks from the each row of data to be obfuscated, wherein the number of the data blocks is predetermined;
generating a dot product which is obtained by: generating a plurality of products by multiplying each of the plurality of data blocks with an exclusive one of the plurality of random numbers and summing the plurality of products; and
generating an obfuscated form of the each row of data to be obfuscated by determining a remainder of a modulo operation which is performed using the dot product as dividend and a predetermined integer as divisor.

The method may further include:

prior to the iterations, determining the integer value and a number of rows of data to be obfuscated;

determining a probability of collision using $1-e^{-L(L-1)/2q}$ wherein q is the determined integer, L is the determined total number of rows of data to be obfuscated and e is the known base of the natural logarithm (approximately equal to 2.718281828); and if the determined probability of collision exceeds a first predetermined threshold, adjusting the integer value.

The method may further include:

determining a data block length which is not greater than the adjusted integer value;

based on the Goldreich-Levin Theorem for Large Fields, determining a probability of distinguishing the obfuscated form with any of the random numbers; and if the determined probability of distinguishing the obfuscated form with any of the random numbers exceeds a second predetermined threshold, adjusting the adjusted integer value and the data block length.

According to one embodiment of the application, a system for obfuscating data is provided. The system comprises:

an obfuscation module communicably coupled to a data source and a randomization module, wherein the randomization module is configured to generate a plurality of random numbers by applying a one-way compression function to a plurality of auxiliary inputs,
wherein the obfuscation module is configured to:
iteratively, for each row of data to be obfuscated:
construct a plurality of data blocks from the each row of data to be obfuscated, wherein the number of the data blocks is predetermined;
generate a dot product which is obtained by: generating a plurality of products by multiplying each of the plurality of data blocks with an exclusive one of the plurality of random numbers and summing the plurality of products; and generate an obfuscated form of the each row of data to be obfuscated by determining a remainder of a modulo operation which is performed using the dot product as dividend and a predetermined integer value as divisor.

In the above embodiments, the plurality of auxiliary inputs to the one-way compression function may include at least one of a secret key to provide irreversibility to the obfuscated form, a data partner identifier to provide collusion resistance, a batch identifier to provide flexibility, and a counter to provide unlinkability to subsequent obfuscation of the each row of data to be obfuscated. In the above embodiments, the one-way compression function may be one of a cryptographic hash function and a block cipher.

BRIEF DESCRIPTION OF THE DRAWINGS

Embodiments of the application are disclosed hereinafter with reference to the drawings, in which:

FIG. 1 shows Tables 1a and 1b containing subscriber data where the primary (linking) key is an unobfuscated mobile number;

FIG. 2 shows Tables 2a to 2c which are to be shared with different partners, and contain subscriber data where the primary (linking) key is an obfuscated mobile number;

DETAILED DESCRIPTION

Figure 3:
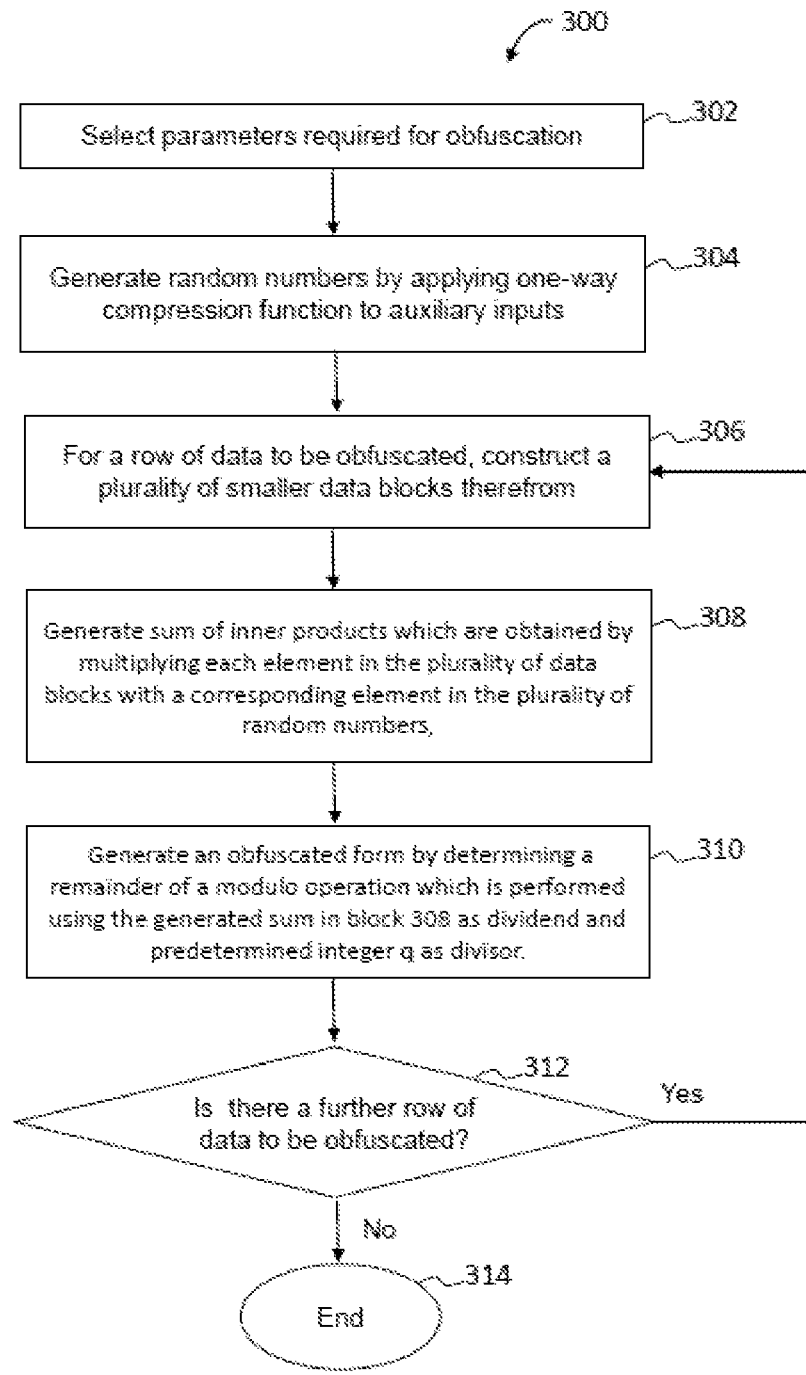
FIG. 3 shows a flow sequence for performing obfuscation of data according to one embodiment of the application.

In the following description, numerous specific details are set forth in order to provide a thorough understanding of various illustrative embodiments of the application. It will be understood, however, to one skilled in the art, that embodiments of the application may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

A method of obfuscating data is described with reference to a flow sequence 300 of FIG. 3 and schematic representations in FIGS. 4A and 4B.

In block 302, various parameters used for obfuscation are determined or selected by a data owner as follows:

A one-way compression function F is selected. For example, a cryptographically secure hash function, such as Secure Hash Algorithm SHA-256, SHA-1, MD5, may be selected. Alternatively, a block-cipher such as Advanced Encryption Standard (AES) may be selected.

A large integer q is selected. The large integer q may be a prime number with 64 bits. The value of q should be chosen based on the total number of rows of data to be obfuscated L and the level of desired collision-resistance. The probability of collision, i.e. the probability of finding any two original data mapping to one obfuscated data can be calculated by:

$1 - e^{-L(L-1)/2q}$;

where e is the known base of the natural logarithm (e=2.718281828 . . . ). This bound is known as the generalized birthday problem. Integer q should be sufficiently large to ensure a sufficiently small calculated probability or to ensure the calculated probability of collision is smaller than a predetermined threshold.

A random or secret key k is selected. The selected key should be at least 128 bits. A number n is selected which corresponds to the total number of data blocks for which a row of data to be obfuscated is to be divided into. A high n value will provide an increased security level; however, computation time will increase. Therefore, there is a tradeoff between computation efficiency and security. Accordingly, different users should select the value of n based on the user's actual system.

In block 304, a plurality of random numbers is generated by applying a one-way compression function to a plurality of auxiliary inputs. The plurality of auxiliary inputs may at least include secret key k (as determined in block 302) to provide irreversibility to the obfuscated data, and partner identifier PID (i.e. identification of a partner which is to receive the obfuscated data) to provide collusion resistance. Based on the auxiliary inputs, F(auxiliary inputs) is computed as a plurality of random numbers $r_1, r_2, \ldots, r_n$. FIG. 4A shows a plurality of random numbers $r_1, r_2, \ldots, r_n$.

Figure 4A:
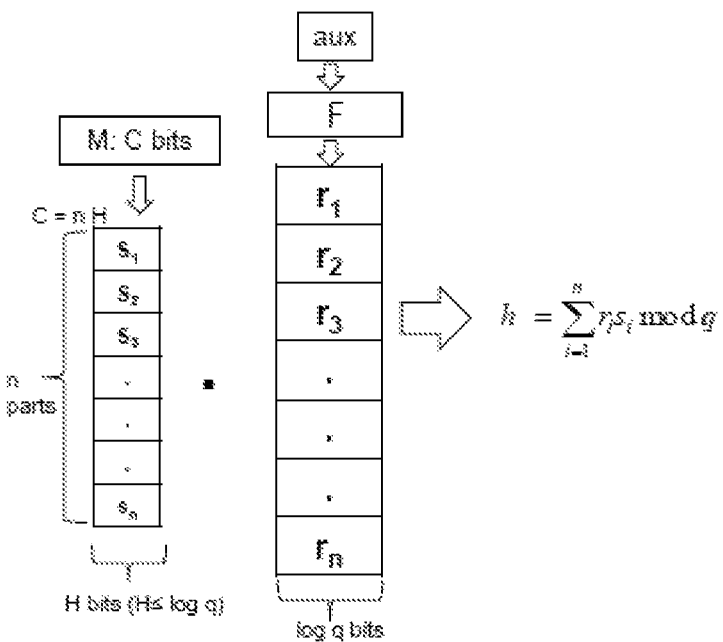
FIG. 4A shows a schematic representation of an obfuscation procedure on a row of original data.

In block 306 of FIG. 3, for a row of original or unobfuscated data M (having C bits), a plurality of smaller data blocks $s_1, s_2, \ldots, s_n$, each having a length H of bit strings, is constructed from the row of data M. The row of data is divided into n blocks where n is determined in block 302. FIG. 4A shows a plurality of data blocks $s_1, s_2, \ldots, s_n$.

One possible way of constructing the smaller data blocks is to set the first H bits of M as $s_1$, the second H bits of M as $s_2, \ldots,$ the $(n-1)^{th}$ H bits of M as $s_{n-1}$, and the remaining bits of M is padded with zeros to form a H bits string $s_n$.

Thereafter, the obfuscated form h of the row of original data is generated based on $$h = \sum_{i=1}^{n} s_i r_i$$

mod q and will be further described in blocks 308 and 310.

In block 308, a dot product is generated which is obtained by: generating a plurality of products by multiplying each of the plurality of data blocks with an exclusive one of the plurality of random numbers and summing the plurality of products. For example, a data block at an $i^{th}$ position is multiplied with a random numbers at an $i^{th}$ position. After the pairs of data block and random number are multiplied, the plurality of products resulting therefrom are summed or added.

In block 310, an obfuscated form of the row of data M is generated by determining a remainder of a modulo operation which is performed using the generated dot product in block 308 as dividend and a predetermined integer value q as divisor. The obfuscated form may then be stored in another table or database.

In block 312, the flow sequence checks whether another row of data is to be obfuscated. If no further row of data is to be obfuscated, the flow sequence proceeds to end in block 314. If there is another row of data is to be obfuscated, blocks 306 to 310 are repeated on the next row of data.

Iteration of blocks 306 to 312 is performed until all designated rows of data are obfuscated. It is to be appreciated that obfuscation of each row of data within the same batch involves re-use of the plurality of random numbers ascertained in block 304.

Figure 4B:
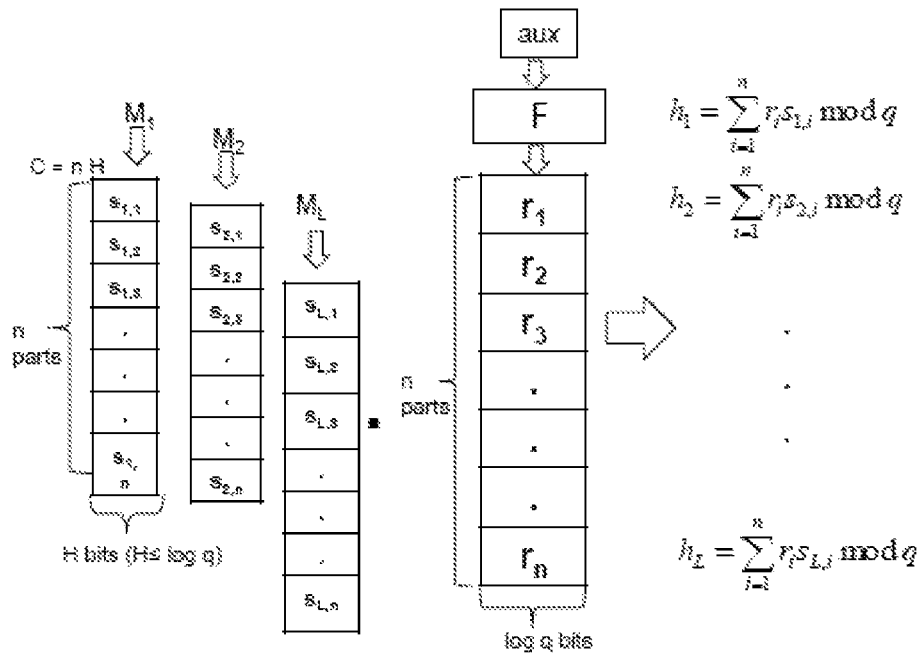
FIG. 4B shows a schematic representation of an obfuscation procedure on multiple rows of original data.

FIG. 4B is a schematic representation of an obfuscation procedure for multiple rows of data $M_1, M_2, \ldots, M_L$. As shown in FIG. 4B and illustrated above, a plurality of random numbers are generated based on the selected compression function and received auxiliary inputs. For each row of data to be obfuscated, the same plurality of random numbers are applied in each generation of dot product, and a modulo operation is performed from the result thereof. Accordingly, iteratively, the obfuscated form of each row of data is generated individually, and may be output to a table or database for obfuscated data.

In the above-described flow sequence, the auxiliary inputs to the one-way compression function may at least include secret key k and partner identifier PID. In certain other embodiments, the auxiliary inputs may additionally include at least one of batch identifier BID and a counter.

The above procedures described with reference to the flow sequence 300 of FIG. 3 may be provided as program instructions. Accordingly, in one embodiment of the application, it is provided a computer program product comprising a non-transitory computer readable medium comprising a computer readable program, wherein the computer readable program when executed by a microprocessor on a computer causes the computer to perform the procedures described with reference to the flow sequence 300 of FIG. 3.

Figure 5:
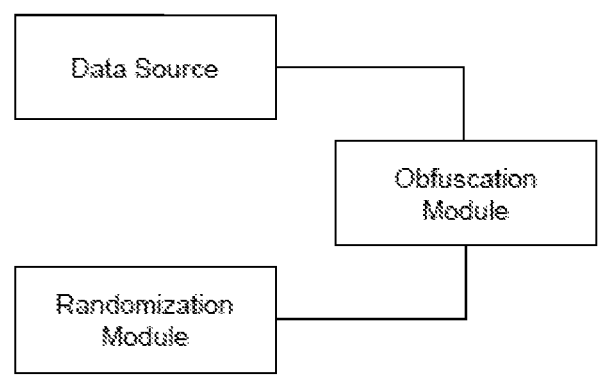
FIG. 5 is a schematic representation of a system for obfuscation of data according to one embodiment of the application.

FIG. 5 is a schematic representation of a system for obfuscation of data, which may be incorporated in a computing system. The system for obfuscation of data comprises an obfuscation module communicably coupled to a data source and a randomization module, wherein the data source and/or randomization module may be located locally or remotely from the obfuscation module.

The randomization module is configured to generate a plurality of random numbers $r_1 \ldots r_{11}$ by applying a one-way compression function to a plurality of auxiliary inputs which may at least include a secret key k and a data partner identifier PID. The obfuscation module is configured to: iteratively, for each row of data M to be obfuscated: construct a plurality of smaller data blocks $s_1 \ldots s_n$ from the each row of data to be obfuscated, wherein the number n of the data blocks is predetermined; generate a dot product which is obtained by: generating a plurality of products by multiplying each of the plurality of data blocks with an exclusive one of the plurality of random numbers and summing the plurality of products; and generate an obfuscated form of the each row of data to be obfuscated by determining a remainder of a modulo operation which is performed using the generated dot product as dividend and a predetermined integer value as divisor.

The obfuscation module is further configured to: prior to the iterations, determine the integer value and a number of rows of data to be obfuscated; determine a probability of collision using $1-e^{-L(L-1)/2q}$ wherein q is the determined integer, L is the determined total number of rows of data to be obfuscated and e is the known base of the natural logarithm (approximately equal to 2.718281828); and if the determined probability of collision exceeds a first predetermined threshold, adjust the integer value.

The obfuscation module is further configured to: determine a data block length H which is not greater than the adjusted integer value; based on the Goldreich-Levin Theorem for Large Fields, determine a probability of distinguishing the obfuscated form with any of the random numbers; and if the determined probability of distinguishing the obfuscated form with a random number exceeds a second predetermined threshold, further adjust the adjusted integer value and the data block length H.

Application 1: Original Data M is a 128 Bits Ciphertext

Using the above-described example related to Tables 2a to 2c of FIG. 2, a telecommunication service provider (data owner) wants to share GPS locations of their subscribers with a partner and, accordingly, employs the application of the present disclosure to obfuscate the encrypted mobile number (which is the primary key) of Tables 2a to 2c.

In this application, the most efficient implementation possible is applied. The parameters are determined as follows: C=128, n=2, H=64, q=$2^{64}$. The data owner selects a 128-bit secret key k and compression function F as the SHA256 hash function.

The obfuscation procedure may be performed as follows:
(1) The random numbers are computed as two 64-bit numbers $(r_1, r_2)$=F(k, PID, BID).
(2) For each row of data:
a. Divide the i-$^{th}$ row of the encrypted mobile number $M_i$ into two 64-bit numbers $(a_i, b_i)$.
b. Output $h_i=r_1*a_i+r_2*b_i$ mod q.

It is to be noted that in this application, the original data is a ciphertext. For efficient implementation, the original data should be substantially uniformly distributed. The distribution of a secure ciphertext satisfies the security requirement.

Application 2: Original Data M has at Least 148 Bits Entropy

In this application, original data M is an arbitrary (encrypted or unencrypted) message. To ensure unpredictability of the obfuscated output, original data M should have at least 148 bits of entropy.

For example, in a database of user names for an email service provider, an email address is in the format username@domain, where the username M may be up to 64 characters long. A permitted username at least includes 52 uppercase and lowercase English letters, 10 digits and 20 special characters (for an English email address). Therefore, the number of possible user names would be $(52+10+20)^{64}=2^{406}$. If the average length of a username is more than 23, the user name has more than 148 bits of entropy. If the email service provider wants to share information stored in several tables in a database where the primary key of the table is the email address, the obfuscation procedure may be performed as follows:
(1) Compute the minimum acceptable value of a prime number q as in block 302. Here, it is assumed that q=128 as determined from block 302.
(2) Select a value H which is less than or equal to q. Divide the original data M into n blocks of bit strings with length H as $(s_1, \ldots, s_n)$ as in block 306. In this example, each character is usually stored as 8 bits, which means that M has 512 bits. Here, it is assumed that H=16, and n=512/16=32.
(3) Calculate the probability E according to the following the Goldreich-Levin Theorem for Large Fields (Yevgeniy Dodis, Shafi Goldwasser, Yael Kalai, Chris Peikert, and Vinod Vaikuntanathan. Public-Key Encryption Schemes with Auxiliary Inputs. In TCC pages 361-381, 2010).

Theorem 1: Let q be prime and let H be an arbitrary subset of GF(q). Let f: $H^n \to \{0,1\}^*$ be any (possibly randomized)

function. If there is a distinguisher D that runs in time t such that $$|Pr[s \leftarrow H^n, y \leftarrow f(s), r \leftarrow GF(q)^n : \overset{D}{\leftarrow} a(y,r,(r,s))=1] - Pr$$
$$[s \leftarrow H^n, y \leftarrow f(s), r \leftarrow GF(q)^n, u \leftarrow GF(q) : \overset{D}{\leftarrow} (y,r,u)=1]$$
$$|=\varepsilon$$

Then there is an inverter A that runs in time $$t' = t \cdot poly(n, |H|, 1/\varepsilon)$$

such that $$Pr[s \leftarrow H^n, y \leftarrow f(s) : A(y) = s] \geq \frac{\varepsilon^3}{512 \cdot n \cdot q^2} \quad (1)$$

Applying the above-described parameter under this theorem, it would be determined that $$2^{406} \geq \frac{\varepsilon^3}{512 \cdot 32 \cdot q^2}.$$

The value q is approximately equal to $2^{128}$, hence ε is at most $2^{-45}$. This is the theoretically maximum probability of distinguishing the obfuscated output with a random number. If this probability is acceptable by the data owner, the current value of q, H and n may be used for future obfuscation.

(4) If this probability of distinguishing the obfuscated output with a random number ε is too large, a larger H (corresponding to a smaller n) may be selected and the value of q may be reconsidered. (A larger q allows for a smaller n, but it makes ε larger). Based on adjusted values of H and q, the above probability analysis is repeated under the Goldreich-Levin Theorem for Large Fields.

(5) Once the parameters are set, the obfuscation procedure can be performed as described in blocks 306 to 312.

In embodiments of the application, the computation overhead for obfuscating L rows of data i.e. $M_1, \ldots, M_L$, involves computation of the compression function to generate random numbers (e.g. Hash computation), n times multiplication and (n−1) times addition modulus q. Accordingly, the application provides an efficient obfuscation method which allows the computed compression function (random numbers) to be reused for each iteration of data obfuscation.

Other security requirements are also satisfied by the application, particularly:

Correctness/Collision-resistance: One original data should always correspond to one obfuscated data, with overwhelming probability. This is possible in the application if a secured compression function (e.g. cryptographic hash function) and integer q is large. Further, the probability of collision can be ascertained for acceptability when selecting parameters.

Irreversibility: Given an obfuscated data, it is computationally difficult to recover the original data if a cryptographic hash function and a secret key are used. For example, if the data to be obfuscated is a mobile phone number and no secret key is used as auxiliary input, it would be easier for an attacker to deduce the original data from the obfuscated data. However, if a secret key, normally a large number and known only to the data owner, is used, the attacker would have to deduce the secret key in order to perform any attack on the obfuscated data. Accordingly, the use of a secret key as an auxiliary input would provide and enhance irreversibility to the obfuscated form/data.

Efficiency: The method of obfuscation should be efficient. This is possible in the application since the random numbers can be re-used for other rows of data in the same batch. Accordingly, the computation overhead involves computation of the compression function (e.g. Hash computation), n times multiplication and (n−1) times addition modulus q.

Collusion Resistance: If the data is shared to different partners, the obfuscated data obtained by different partners should not be the same. This is possible in the application, if a secure compression function (e.g. cryptographic hash function) and number of h values obtained by attacker <(L+P) n−1, where P is the number of different partners. These h values represent the total number of outputs $h_1$, $h_2, \ldots h_L$ that was computed using the same set of original data $M_1, M_2, \ldots M_L$ shared with P partners. Further, if data partner identifier is specified as one of the inputs for generating the random numbers, the obfuscated data would be collusion resistant.

Flexibility: If data is shared in batches for the same partner, the obfuscated data obtained in different batches may either be the same or different, depending on the application. With reference to Table 2a of FIG. 2, for example, the data partner may wish to count the number of people at a certain location at a certain time, or track the movement of people in the area. In the former application, a second batch of obfuscated data should contain mobile numbers which are obfuscated in a different way from the first batch to ensure higher user privacy. In the latter application, a second batch of obfuscated data should contain mobile numbers which are obfuscated in the same way as the first batch. In the application, the obfuscated data obtained in different batches may be different if a batch identifier is specified as one of the auxiliary inputs for generating the random numbers, and thereby provides flexibility to alter obfuscated data when required. Further, in certain applications where obfuscation would be performed on the same set of original data M at least two or more times, the auxiliary inputs may include a counter which is incremented upon each subsequent obfuscation of the same set of original data. As a result, a first obfuscated data of a set of original data M would differ with each subsequent obfuscation of the same set of original data M. By simply examining the different obfuscated data, an attacker would be unable to ascertain a link to the same set of original data. Accordingly, the use of a counter as an auxiliary input provides unlinkability to subsequent obfuscation of the same original data. Other embodiments will be apparent to those skilled in the art from consideration of the specification and practice of the application. Furthermore, certain terminology has been used for the purposes of descriptive clarity, and not to limit the disclosed embodiments of the application. The embodiments and features described above should be considered exemplary.

The invention claimed is:

1. A method of obfuscating user data from a data source, the method comprising:
   generating, by a processor, a plurality of random numbers by applying a one-way compression function to a plurality of auxiliary inputs;
   iteratively, for each row of user data to be obfuscated:
      constructing, by the processor, a plurality of data blocks from each row of the user data to be obfuscated, wherein the number of data blocks is predetermined;
      generating, by the processor, a dot product which is obtained by: generating a plurality of products by multiplying each of the plurality of data blocks with a respective random number of the plurality of random numbers and summing the plurality of products; and
generating, by the processor, an obfuscated form for each row of the user data to be obfuscated by determining a remainder of a modulo operation using the dot product as dividend and a predetermined integer value as divisor; and
sharing, by the processor, each row of the user data in the obfuscated form.

2. The method of claim 1, wherein the plurality of auxiliary inputs to the one-way compression function include at least one of the following: a secret key to provide irreversibility, a data partner identifier to provide collusion resistance, a batch identifier to provide flexibility, or a counter to provide unlinkability.

3. The method of claim 1, further comprising:
prior to the iterations, determining the predetermined integer value and a number of rows of user data to be obfuscated;
obtaining a probability of collision using $1-e^{-L(L-1)/2q}$ wherein q is the predetermined integer value, and L is the determined number of rows of user data to be obfuscated; and
based on the obtained probability of collision exceeding a first predetermined threshold, adjusting the predetermined integer value.

4. The method of claim 3, further comprising:
obtaining a data block length which is not greater than the adjusted integer value;
based on the Goldreich-Levin Theorem for Large Fields, determining a probability of distinguishing the obfuscated form with any of the random numbers; and
based on the determined probability of distinguishing the obfuscated form with any of the random numbers exceeding a second predetermined threshold, adjusting the adjusted integer value and the data block length.

5. The method of claim 1, wherein the one-way compression function is a cryptographic hash function or a block cipher.

6. A non-transitory computer readable medium comprising processor-executable instructions for obfuscating user data from a data source, the processor-executable instructions, when executed, facilitating performance of the following:
generating a plurality of random numbers by applying a one-way compression function to a plurality of auxiliary inputs;
iteratively, for each row of user data to be obfuscated:
constructing a plurality of data blocks from each row of the user data to be obfuscated, wherein the number of data blocks is predetermined;
generating a dot product which is obtained by: generating a plurality of products by multiplying each of the plurality of data blocks with a respective random number of the plurality of random numbers and summing the plurality of products; and
generating an obfuscated form for each row of the user data to be obfuscated by determining a remainder of a modulo operation using the dot product as dividend and a predetermined integer value as divisor; and
sharing each row of the user data in the obfuscated form.

7. The non-transitory computer readable medium of claim 6, wherein the plurality of auxiliary inputs to the one-way compression function include at least one of the following: a secret key to provide irreversibility, a data partner identifier to provide collusion resistance, a batch identifier to provide flexibility, or a counter to provide unlinkability.

8. The non-transitory computer readable medium of claim 6, wherein the processor-executable instructions, when executed, further facilitate:
prior to the iterations, determining the predetermined integer value and a number of rows of user data to be obfuscated;
obtaining a probability of collision using $1-e^{-L(L-1)/2q}$ wherein q is the predetermined integer value, and L is the determined number of rows of user data to be obfuscated; and
if the obtained probability of collision exceeds a first predetermined threshold, adjusting the predetermined integer value.

9. The non-transitory computer readable medium of claim 8, wherein the processor-executable instructions, when executed, further facilitate:
obtaining a data block length which is not greater than the adjusted integer value;
based on the Goldreich-Levin Theorem for Large Fields, obtaining a probability of distinguishing the obfuscated form with any of the random numbers; and
if the obtained probability of distinguishing the obfuscated form with any of the random numbers exceeds a second predetermined threshold, adjusting the adjusted integer value and the data block length.

10. The non-transitory computer readable medium of claim 9, wherein the one-way compression function is a cryptographic hash function or a block cipher.

11. A system for obfuscating user data, the system comprising one or more processors and one or more non-transitory computer readable media having processor-executable instructions stored thereon, wherein the processor-executable instructions, when executed by the one or more processors, are configured to facilitate:
generating a plurality of random numbers by applying a one-way compression function to a plurality of auxiliary inputs;
iteratively, for each row of user data to be obfuscated:
constructing a plurality of data blocks from each row of the user data to be obfuscated, wherein the number of data blocks is predetermined;
generating a dot product which is obtained by: generating a plurality of products by multiplying each of the plurality of data blocks with a respective random number of the plurality of random numbers and summing the plurality of products; and
generating an obfuscated form for each row of the user data to be obfuscated by determining a remainder of a modulo operation using the dot product as dividend and a predetermined integer value as divisor; and
sharing each row of the user data in the obfuscated form.

12. The system of claim 11, wherein the plurality of auxiliary inputs to the one-way compression function include at least one of: a secret key to provide irreversibility, a data partner identifier to provide collusion resistance, a batch identifier to provide flexibility, or a counter to provide unlinkability.

13. The system of claim 11, wherein the processor-executable instructions, when executed, are further configured to facilitate:
prior to the iterations, determining the predetermined integer value and a number of rows of user data to be obfuscated;

obtain a probability of collision using $1-e^{-L(L-1)/2q}$ wherein q is the predetermined integer value, and L is the determined number of rows of user data to be obfuscated; and if the obtained probability of collision exceeds a first predetermined threshold, adjusting the predetermined integer value.

14. The system of claim 13, wherein the processor-executable instructions, when executed, are further configured to facilitate:

obtaining a data block length which is not greater than the adjusted integer value;

based on the Goldreich-Levin Theorem for Large Fields, determining a probability of distinguishing the obfuscated form with any of the random numbers; and if the determined probability of distinguishing the obfuscated form with any of the random numbers exceeds a second predetermined threshold, adjusting the adjusted integer value and the data block length.

15. The system of claim 11, wherein the one-way compression function is a cryptographic hash function or a block cipher.

\* \* \* \* \*